United States Patent [19]
Halstead, Jr. et al.

[11] Patent Number: 5,896,524
[45] Date of Patent: Apr. 20, 1999

[54] OFF-LINE CLOCK SYNCHRONIZATION FOR MULTIPROCESSOR EVENT TRACES

[75] Inventors: Robert H. Halstead, Jr., Belmont, Mass.; Robert Buff, Freising, Germany

[73] Assignee: Digital Equipment Corporation, Maynard, Mass.

[21] Appl. No.: 08/796,829

[22] Filed: Feb. 6, 1997

[51] Int. Cl.$^6$ .................................................. G06F 1/04
[52] U.S. Cl. ........................................ 395/553; 395/182.1
[58] Field of Search .................................. 395/551, 553, 395/555, 556, 557, 558, 182.1, 182.09, 185.08

[56] References Cited

U.S. PATENT DOCUMENTS

| | | | |
|---|---|---|---|
| 5,041,966 | 8/1991 | Nakai et al. | 395/553 |
| 5,239,641 | 8/1993 | Horst | 395/553 |
| 5,347,559 | 9/1994 | Hawkins et al. | 395/557 |
| 5,353,436 | 10/1994 | Horst | 395/553 |
| 5,369,640 | 11/1994 | Watson et al. | 307/409 |
| 5,530,846 | 6/1996 | Strong | 395/551 |
| 5,551,050 | 8/1996 | Ehlig et al. | 395/182.09 |
| 5,715,438 | 2/1998 | Silha | 395/551 |
| 5,758,132 | 5/1998 | Strahlin | 395/556 |
| 5,802,378 | 9/1998 | Arndt et al. | 395/553 |

*Primary Examiner*—Moustafa M. Meky
*Attorney, Agent, or Firm*—Graham & James LLP

[57] ABSTRACT

Local clock data is collected at run time in a multiprocessor system. Postprocessing is used to determine a global time base from the local clock readings. Clock drift and offset parameters are calculated for the local clocks. These parameters are used to adjust the time stamps of events in a global event log in order to create a global time base. A first method is used to calculate clock drift and offset parameters between processors with two or more event pairs oriented in the same direction. A second method is used to calculate clock drift and offset parameters between processors with event pairs oriented in opposite directions. A third method is used where the processors have no event pairs between them.

6 Claims, 3 Drawing Sheets

OFF-LINE CLOCK SYNCHRONIZATION FOR MULTIPROCESSOR EVENT TRACES

FIELD OF THE INVENTION

This invention relates generally to computer systems, and more particularly to multiprocessor systems having local clocks.

BACKGROUND OF THE INVENTION

In computer systems, a common method for monitoring the execution of programs is to collect an event trace. An event trace is a record of significant events that occurred during the program execution together with information about the timing of the events. The utility of an event trace is enhanced when the timing measurements, also referred to as the time base, are precise and accurate. Many systems offer highly precise local time bases, such as the cycle counter on Alpha processors. In a distributed computer system with multiple processors, each having an independent clock, a precise global time base is not available. Without a precise global time base, it is difficult to compare the timing of events on different processors. For example, without a precise global time base, it is difficult to determine the time taken to send a message from one processor to another.

A simple model of the relationship between the global time g and a processor's local time t is $$t = A * g + B \qquad (1)$$

where A is drift, the rate difference between g and t, and B is an offset between readings of g and t. Generally, the drift and the offset will be different for each processor, and the problem of labeling events in an event trace with their global times reduces to calculating drift and offset parameters for each processor so that local times measured on that processor can be converted to a common global time base.

Past attempts to solve the local to global time problem have focused on clock-synchronization protocols in which processors exchange messages in a predetermined pattern before beginning a computation in order to collect data which can be used to estimate the relationship between their local time bases and an agreed-upon global time base. These protocols can be effective, but they perturb the computation being traced. First, they require additional message communication that is not part of the computation being monitored. Second, they require computation at run-time to translate local clock readings to corresponding global clock readings. These extraneous activities can perturb measurements beyond the basic perturbation that results from collecting an event trace. Moreover, the drift values of the local clocks must be known a priori, since they are not calculated by the clock-synchronization algorithm.

It remains desirable to have an efficient method for synchronizing local clocks to a global time base in a computer system.

SUMMARY OF THE INVENTION

The problems of synchronizing local clocks to a global time base are solved by the present invention of collecting local clock data at run time and synchronizing the local clocks to a global time base with a postprocessor.

Instead of calculating the relationship between local and global clocks at run time, data is collected from local clocks at run time and then a postprocessor is used to estimate a corresponding global time base. Clock drift and offset parameters are calculated for the local clocks. These parameters are used to adjust the time stamps of events in a global event log in order to create a global time base. A first method is used to calculate clock drift and offset parameters between processors with two or more event pairs oriented in the same direction. A second method is used to calculate clock drift and offset parameters between processors with event pairs oriented in opposite directions. A third method is used where the processors have no event pairs between them.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
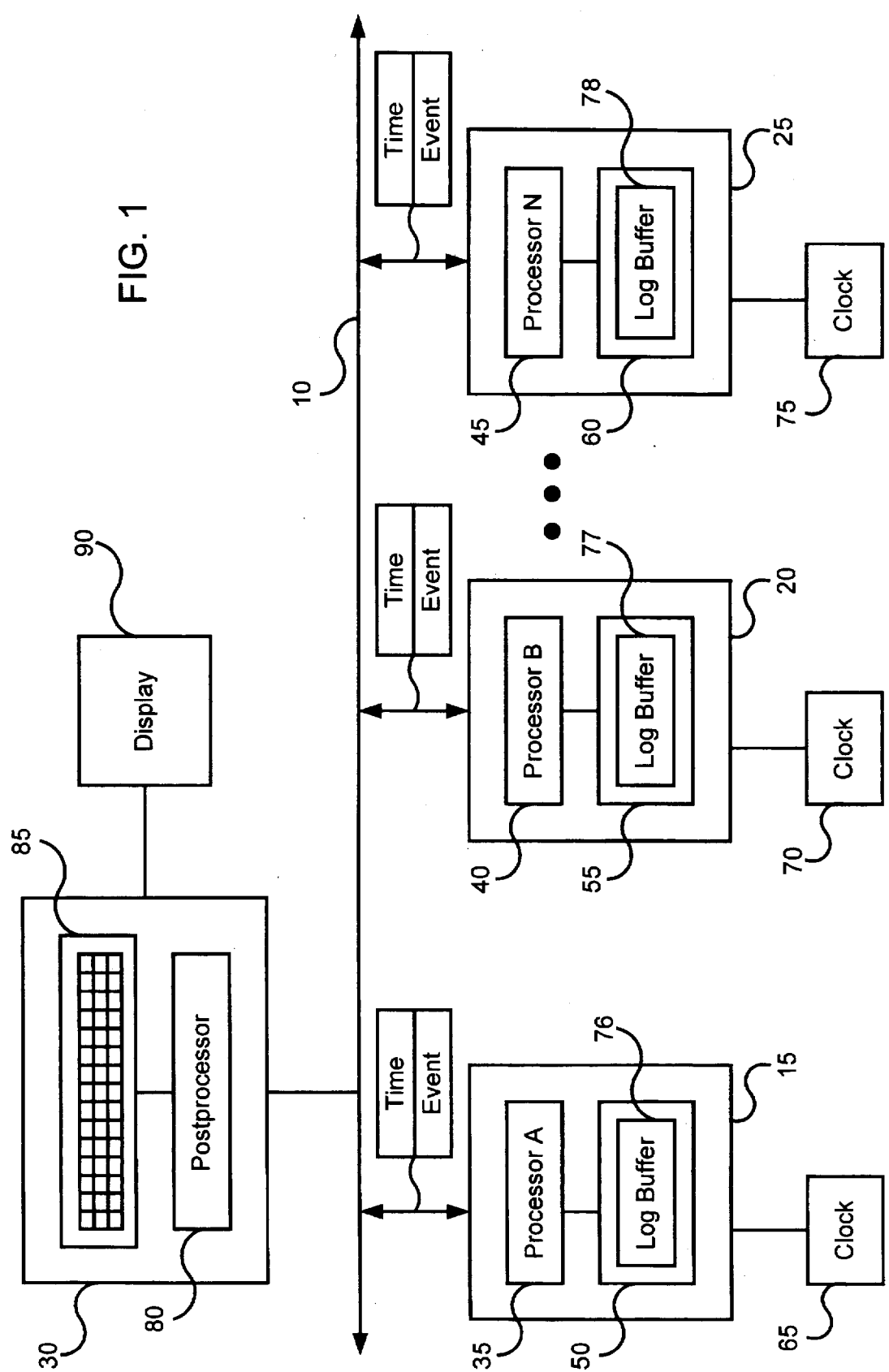
FIG. 1 is a block diagram of a distributed computer system.

FIG. 1 shows a distributed computer system in which a network 10 connects a number of computer systems, system A 15, system B 20 through system N 25 and a postprocessor system 30. The network 10 shown is an Ethernet style network, however the present invention may be implemented in any distributed computing environment including those which employ other types of networks, such as ring networks or ATM networks. Each computer system 15, 20, 25 has a processor 35, 40, 45, a memory 50, 55, 60 and a local clock 65, 70, 75. Each memory 50, 55, 60 has a log buffer 76, 77, 78 for storing event data. The postprocessor system 30 has a postprocessor 80, a memory 85 and a display unit 90.

Each computer system 15, 20, 25 on the network 10 runs in accord with its local clock 65, 70, 75. The clocks 65, 70, 75 operate independently of each other. Over time, as the computer systems operate, the faster clocks move ahead of the slower clocks. This difference in the clock rates is called drift. In addition, the local clocks are offset in time from each other as a result of different clock starting times. From time to time, one of the systems 15, 20, 25 sends a message, a send event, which is received by another of the systems 15, 20, 25, a receive event. Latency is the delay from a send event to a receive event. In order to coordinate the activity of the various systems on the network so that communications between the systems may occur, a global time base must be determined to provide a common reference point for the timing of events in the various processors.

Figure 2:
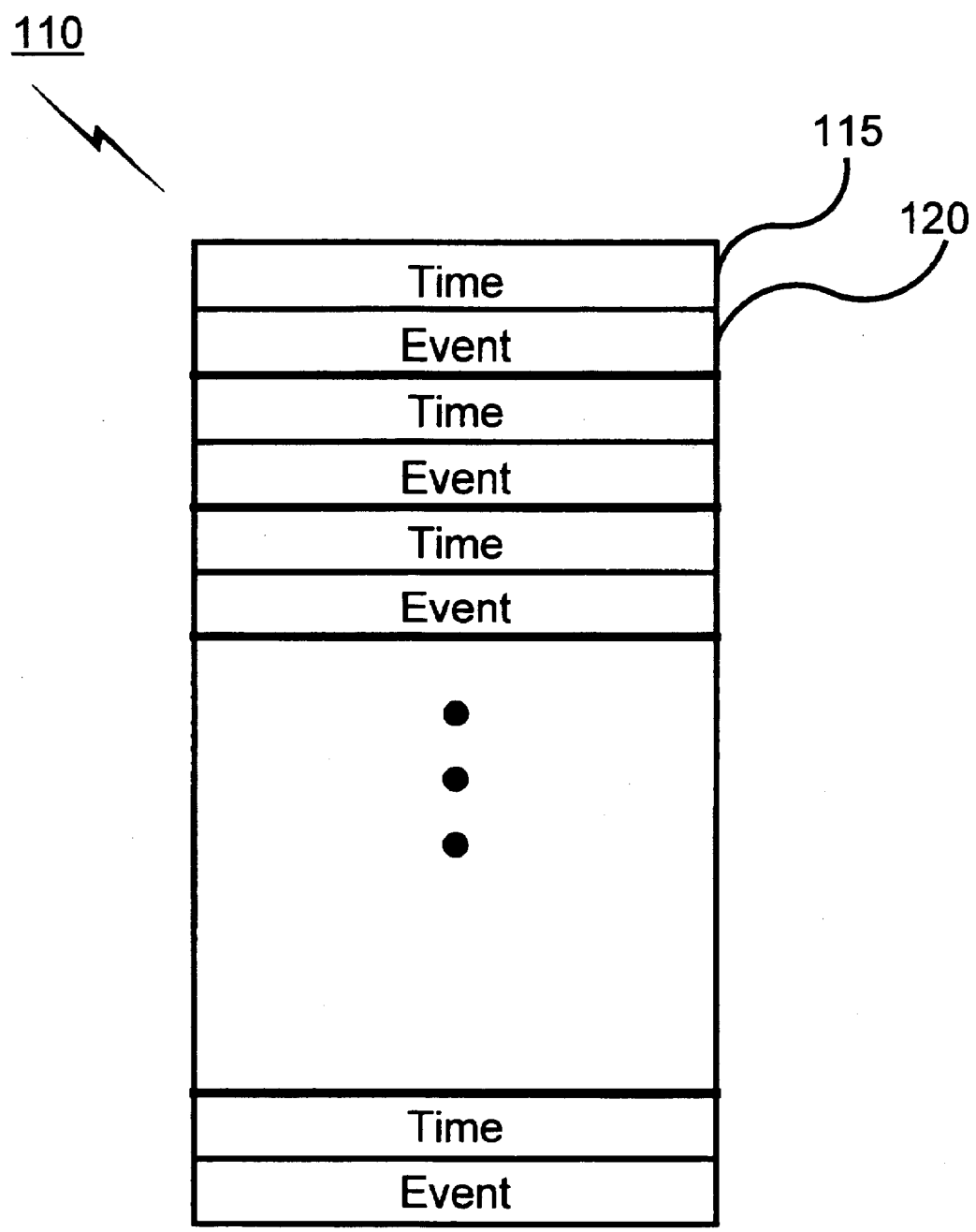
FIG. 2 is a block diagram of an event log.

In order to determine a global time base, the postprocessor system 30 gathers event data from the computer systems 15, 20, 25 attached to the network 10. The event data is used to create an event log 110 illustrated in FIG. 2. The event data includes time data 115 and information identifying the event 120. Related events occurring on different processors are matched up, drift and offset parameters are derived from them, and a global time base is determined.

Figure 3:
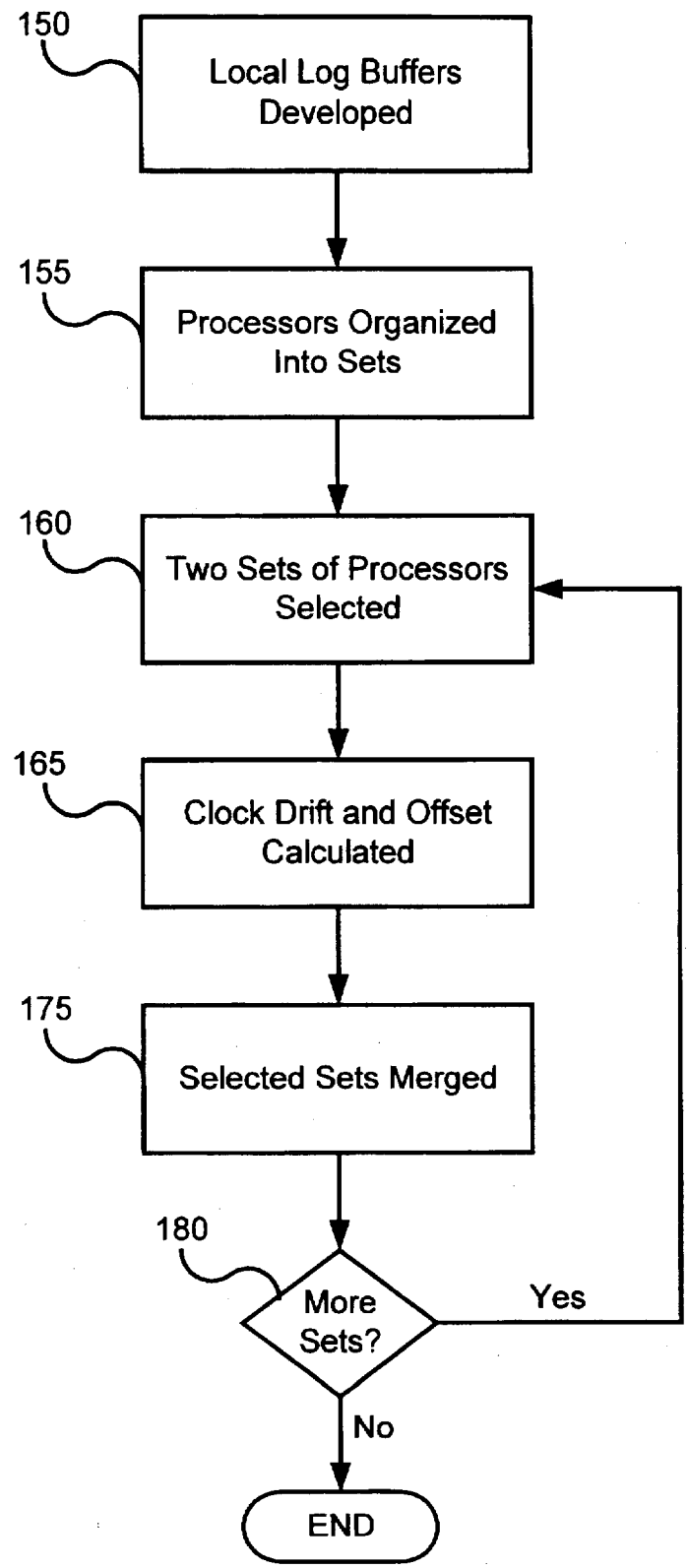
FIG. 3 is a flow chart of the method of determining a global time base.

FIG. 3 shows the process by which the global time base is determined. Each processor 35, 40, 45 samples its local clock 65, 70, 75 when an event e occurs and writes a timestamp for the event along with other data identifying the event into the log buffer 76, 77, 78 contained in the system memory 50, 55, 60, block 150. Both send and receive events are logged. For example, logging occurs whenever processor A sends a message x to processor B. Processor A appends an entry $e_s$ to its log that identifies x. Similarly, processor B appends a record $e_r$ to its log upon receiving x.

The postprocessor organizes the processors into sets where initially each set contains only one processor, block 155. Then, two sets of processors are selected to be merged, block 160. The sets are chosen with preference given to those sets which have at least two event pairs oriented in the same direction. An event pair consists of a send event and a receive event associated with a particular message. Using processor A and processor B as an example, if two different messages were sent from processor A to processor B, that would be an example of two event pairs oriented in the same direction.

An intermediate time base, referred to as the merged time base, is determined from the two selected sets. To determine the merged time base from the two selected sets, drift and offset values are computed such that variations between the latency of event pairs, i.e. the time delay according to the merged time base between the corresponding send and receive events, will be minimized and show no systematic increasing or decreasing trend over time, block 165. This applies only to event pairs that occurred on processors in the merged set. That is, the average latency for a message sent from system A to be received at system B should not change from the beginning to the end of the computation. If there are event pairs from system B to system A as well as from system A to system B, their latencies can be taken into account as well. Other measurement criteria may be used, but this is the criterion used in the present embodiment of the invention. The computed drift and offset parameters are used to modify the time stamps of events in the event log thus synchronizing the two selected sets. Once the two selected sets have been synchronized, they are merged into a single set.

One of three methods can be used to compute drift and offset values. The first method, D1, applies when there are at least two event pairs oriented in the same direction between the two processor sets. The second method, D2, applies when there are two event pairs between the sets, even if they are not both oriented in the same direction. D2 requires that at least one of the sets already contains more than one processor, with at least some event pairs between processors in that set. The third method, D3, applies to the merging of two sets of processors with no event pairs between the two sets, but requires each of the sets being merged to contain more than one processor and to have some event pairs between processors in the set. D3 provides the least accurate information, and in particular, cannot provide an estimate of the offset between the timing of events in one set and events in the other set, but D3 can at least adjust the drift so that the rate of increase of clocks in the two sets are roughly equalized.

The first method, D1, utilizes linear regression to compute a set of drift and offset parameters. Method D1 consists of constructing a graph on which each send/receive pair is plotted as a point whose x co-ordinate is the local time of the send operation on the sending processor and whose y co-ordinate is the local time of the receive operation on the receiving processor. Then the straight line that best fits this collection of points is drawn. The drift and offset parameters can be computed from the slope and intercept of this line. Method D1 is possible whenever there are at least two event pairs oriented in the same direction between the given pair of processors.

Method D2 combines a least square error merit function with a linear regression method where the latency is estimated from the drift data.

Method D3 is an arithmetic method which is the least accurate of the three methods. The ratio of the average latency of the first selected set and the average latency of the second selected set is taken as the drift parameter and the time stamps in the event log are modified accordingly.

The two sets of processors are merged into a single set upon synchronization, block 175. Thus, after each round of the synchronization process, a pair of sets is merged into one larger set as described above. After synchronization, the relationship between the original sets' clocks is known and therefore the set can be considered to have a single local clock for the purpose of being merged further with other sets.

After the first two sets are merged, two more sets of processors are selected, again with preference given to those sets which have at least two event pairs oriented in the same direction. The synchronization and merger process continues until all of the processors are merged into a single set, block 180.

While the invention has been explained in terms of send/receive event pairs, the computation can use any set of event pairs in which there is a causal relationship that forces one event to occur before the other in global time.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. In a distributed computer system including a plurality of processors connected to each other by a network, each processor including a clock for determining a rate at which the processor operates, the clocks being independent of each other, the plurality of processors generating sporadic events, a computer implemented method for determining the temporal relationships of the events occurring in the plurality of processors comprising the steps of:

sampling, in each processor, a clock reading when an event occurs;

writing the sampled clock reading, and information identifying the sampled event, to a log buffer as an entry;

sending the entry, via the network, to a postprocessor connected to the network;

writing each receive entry into an event log in said postprocessor;

selecting from the plurality of processors a first and second set of processors, each set containing at least one processor; and merging the event log entries of the selected sets to determine a global time base which can be used to determine the temporal relationship among the sporadic events.

2. The method of claim 1 further comprising:

modifying the entries stored in the event log to minimize variations between the latency of event pairs.

3. The method as in claim 2 where said modifying step further comprises:

applying a selected one of a set of algorithms, a first algorithm, D1, applies when there are at least two event pairs oriented in the same direction between the first and second set of processors, a second algorithm, D2, applies where there are at least two event pairs between the sets of processors, where the event pairs are oriented in opposite directions, and if at least one of the sets has more than one processor;

a third algorithm, D3, applies where there are no event pairs between the two sets, and only if the sets of processors each contain more than one processor.

4. The method of claim 2 or claim 3 wherein the entries are modified using clock drift and clock offset parameters derived from the clock readings.

5. The method of claim 1 further comprising:

selecting two more sets of processors and continuing the event log merging process until all of the processors are merged into a single set.

6. The method of claim 1 wherein said sampling step further comprises:

sampling a clock signal at send and receive events.

* * * * *